Dec. 8, 1970    TAKAO KUBO ET AL    3,546,475
SYSTEM FOR SEPARATING STEAM POWER PLANT FROM
LARGE ELECTRIC POWER SYSTEM
Filed Feb. 17, 1969    11 Sheets-Sheet 1
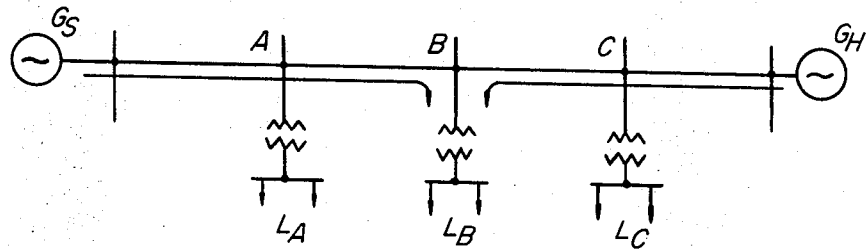
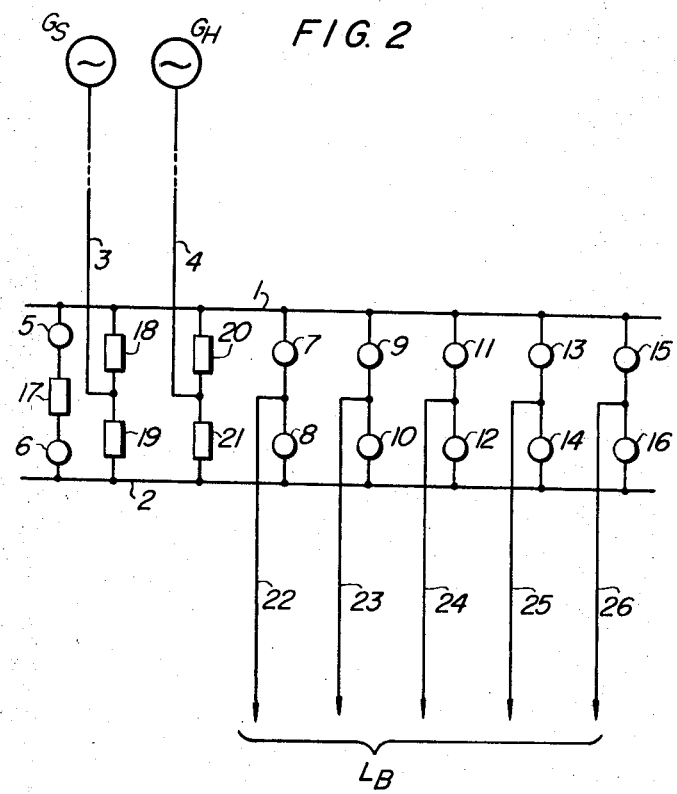
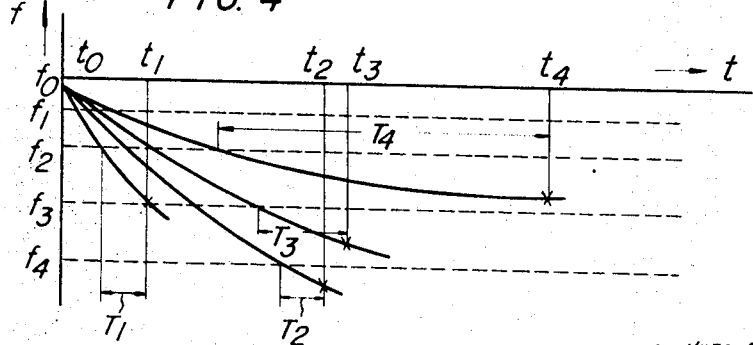
INVENTORS
TAKAO KUBO AND KATSUJI MURAI
BY Craig, Antonelli, Stewart & Hill
ATTORNEYS

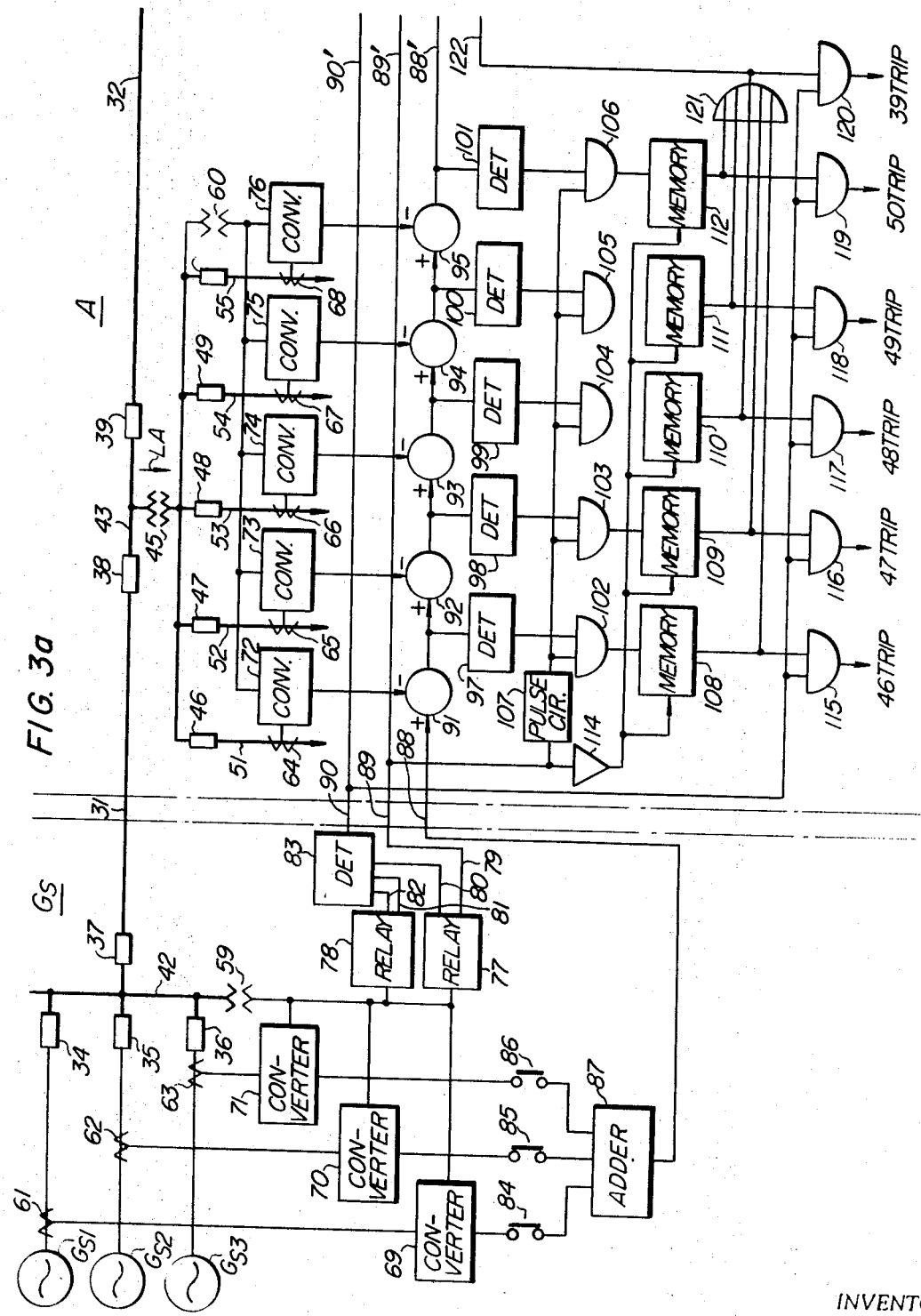

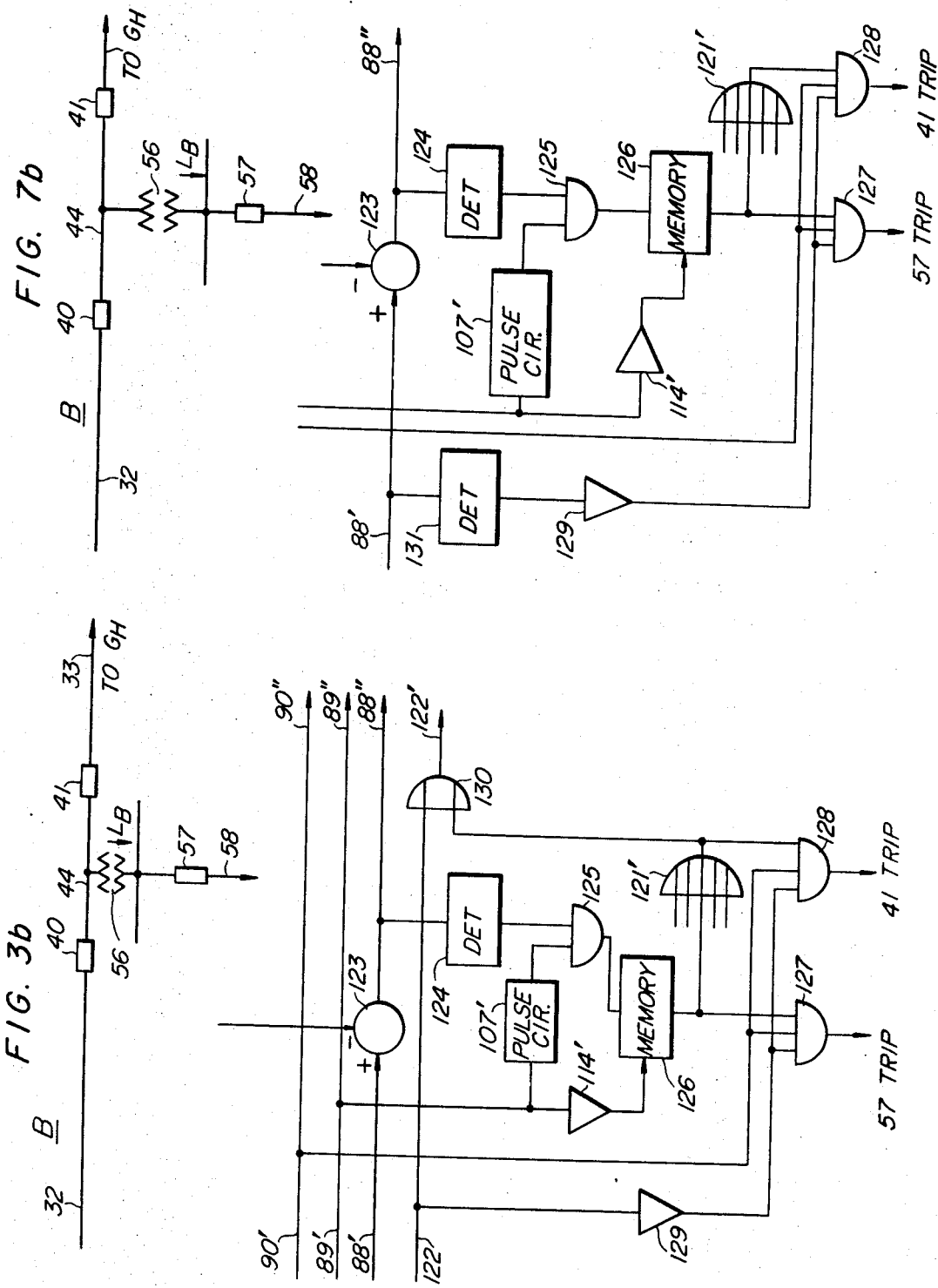

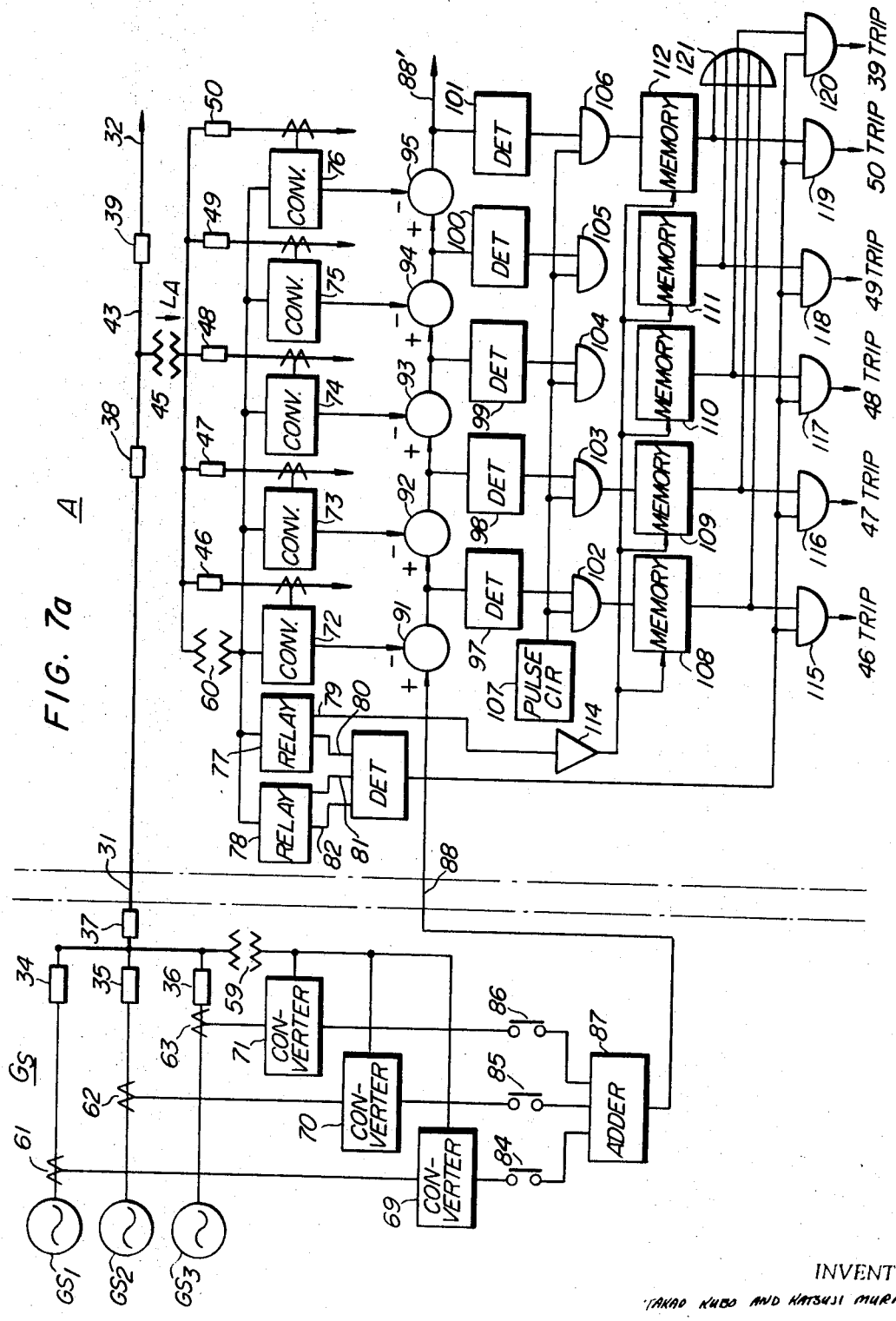

Dec. 8, 1970    TAKAO KUBO ET AL    3,546,475
SYSTEM FOR SEPARATING STEAM POWER PLANT FROM
LARGE ELECTRIC POWER SYSTEM
Filed Feb. 17, 1969    11 Sheets-Sheet 6

INVENTORS
TAKAO KUBO AND KATSUJI MURAI

BY Craig, Antonelli, Stewart & Hill

ATTORNEYS

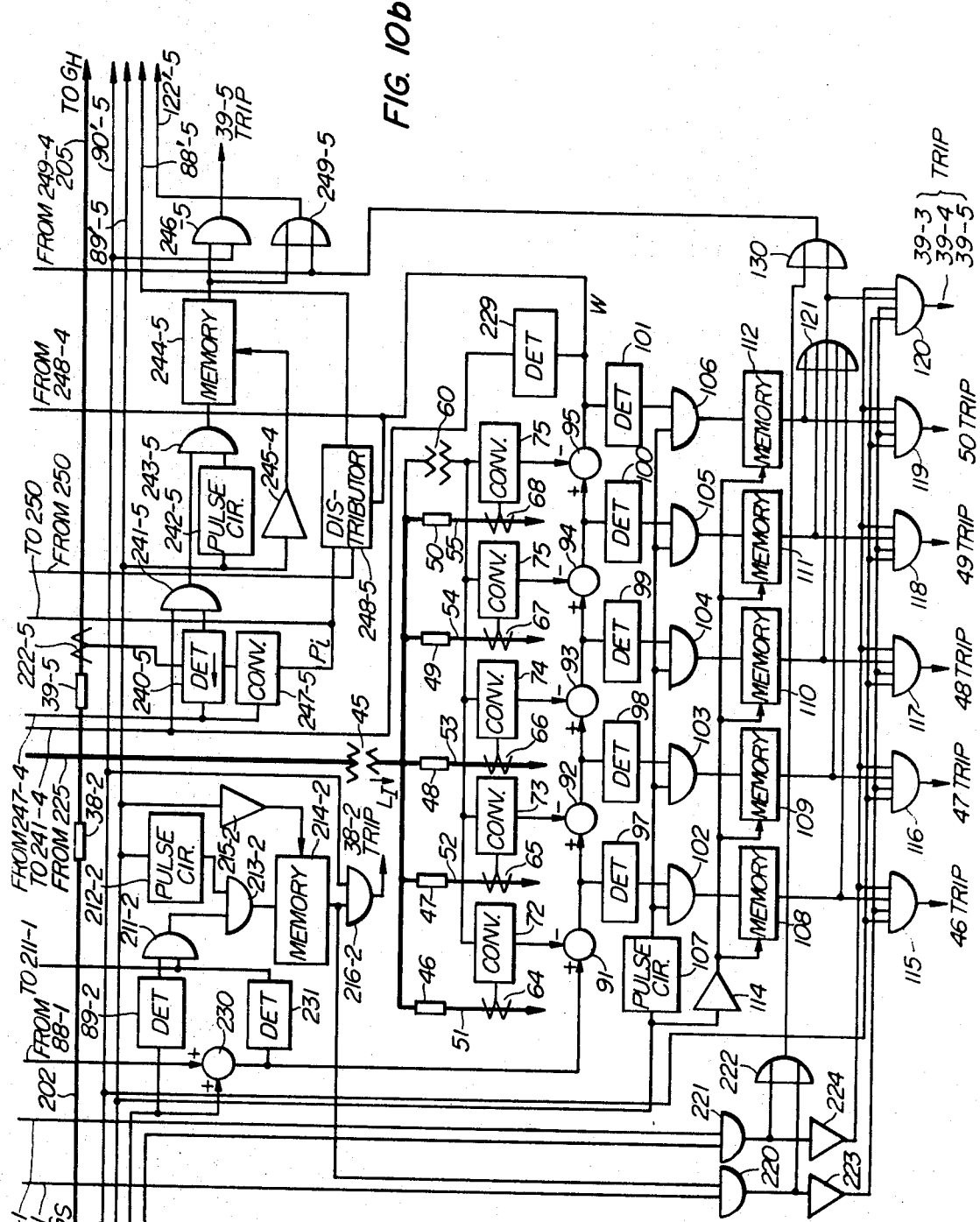

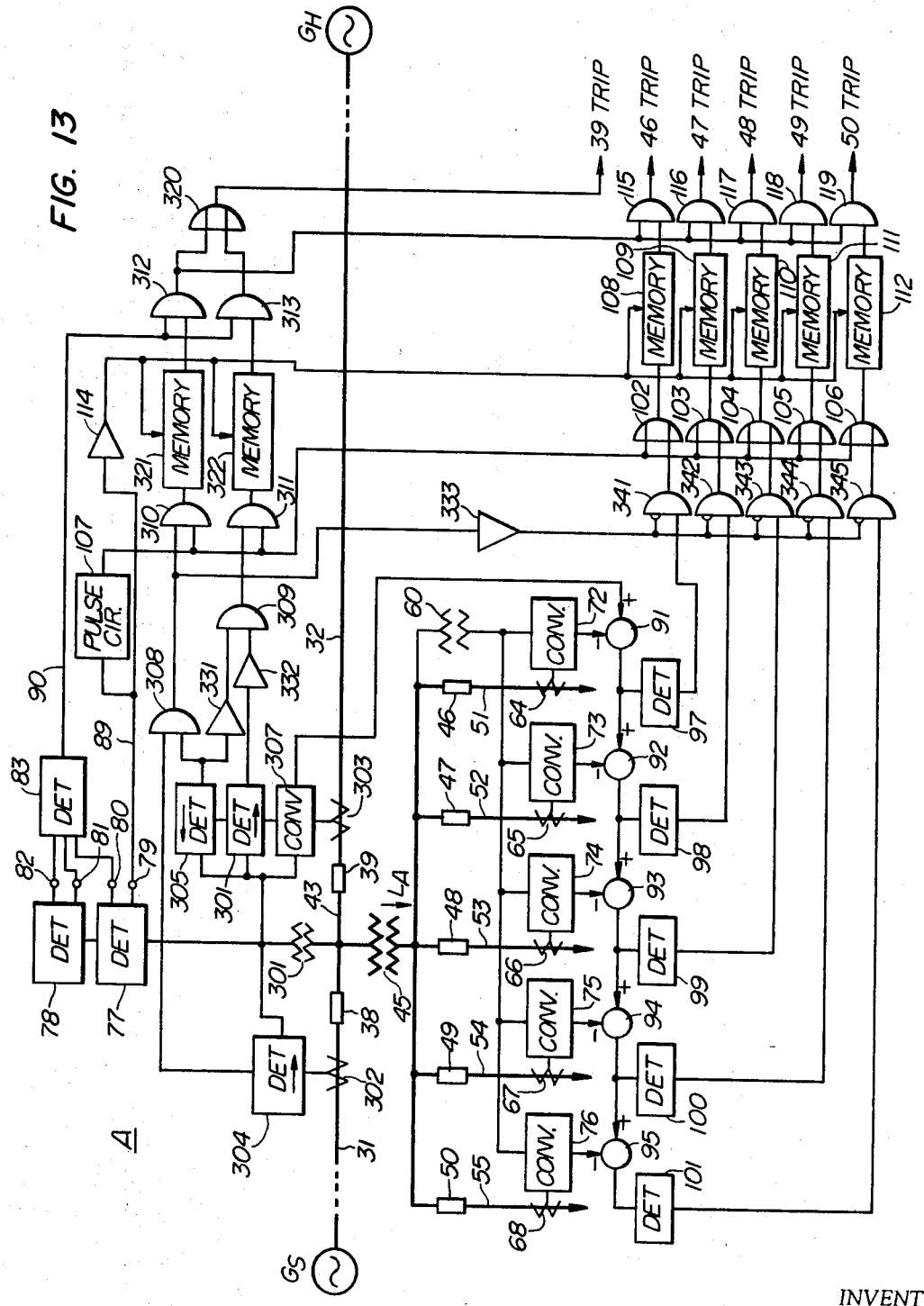

United States Patent Office 3,546,475
Patented Dec. 8, 1970

3,546,475
SYSTEM FOR SEPARATING STEAM POWER PLANT FROM LARGE ELECTRIC POWER SYSTEM
Takao Kubo and Katsuji Murai, Hitachi-shi, Japan, assignors to Hitachi, Ltd., Tokyo, Japan, a corporation of Japan
Filed Feb. 17, 1969, Ser. No. 799,870
Claims priority, application Japan, Feb. 19, 1968, 43/10,066; Apr. 3, 1968, 43/22,346
Int. Cl. H02j 3/41
U.S. Cl. 307—85          15 Claims

ABSTRACT OF THE DISCLOSURE

A system for separating a steam power plant from a large electric power system in which a signal representing the output from a steam turbine generator that can continue to stably operate even when it is separated from the large electric power system is transmitted through pilot wires to electrical stations connected in cascade. In each electrical station, signals representing the load of feeders are successively deducted from the above signal. When the frequency of the electric power system drops below a predetermined value, the steam turbine generator is separated from the large electric power system at an electrical station which is nearest to the steam power plant among those stations in which the result of deduction gives a negative value, and a predetermined limitation is imposed on the load of the electrical station.

BACKGROUND OF THE INVENTION

Field of the invention

This invention relates to a system for the separation of a steam power plant from a large electric power system.

Description of the prior art

Recently, the demand for electric power is increasing more and more. In order to improve the economy and reliability of electric power supply in connection with the increasing demand for electric power, enlargement of the capacity of electrical apparatus is promoted and interconnection of electric power systems is reliably put into practice to meet the above demand.

As is already known, the interconnection of electric power systems provides various merits in respect of ease of maintenance of system stability, feasibility of intersupply of electric power between the systems and economic use of equipment as the scale of the combined electric power system becomes larger. However, in case fault should occur in such a system, considerable damage is imparted to the equipment in the system because the short-circuit capacity thereof is so large. Further, a circuit breaker having a large circuit breaking capacity is required in such a system. Moreover, the stable operation of the whole system is endangered when step out should occur. Furthermore, protective relays may not properly operate because of the fact that the structure of the whole system becomes quite complex, and therefore there is a possibility that fault occurring at some place adversely affects the proper operation of the equipment at other places.

A modern steam turbine generator of large capacity has a weak point in its incapability of operation at low frequencies. Thus, when some accidental faults are accumulated to produce the so-called multiple faults or when a fault propagates from one place to another to bring forth a large frequency drop, the steam turbine generator drops out of the system to further enlarge the degree of frequency drop and this may give rise to a complete failure of the whole system.

When the frequency is difficult to maintain due to occurrence of such a serious fault, the steam power system must be separated from the associated system before the stably operable frequency limit of the steam turbine generator is reached so that it supplies a load with electric power which matches the generating power of the steam power plant and so as to prevent dropout of the steam turbine generator thereby to minimize the area of outage.

SUMMARY OF THE INVENTION

It is therefore an object of the present invention to provide a system for the separation of a steam power plant from a large electric power system in which means are provided to automatically detect the separating point in spite of shifting of the separating point due to a change in the structural and operating conditions of the electric power system.

Another object of the present invention is to provide a system of the above character which is also applicable to an electric power system having parallel branch routes.

A further object of the present invention is to provide a system of the above character in which there is no need for continuously watching the direction of flow of electric power for the sake of separation and a steam turbine generator can successfully be separated from an associated electric power system since the steam turbine generator is separated from the associated system in the state in which it carries a load just before the fault.

In accordance with the present invention, the separation of a steam power plant can stably and reliably be effected because the output from a steam turbine generator which can not participate in the single operation due to some reason, for example, due to poor controllability is eliminated and a confluence point of flows of electric power is then detected to determine the point of separation.

In accordance with the present invention, further, an electrical station is selected as a separating point between the steam power system and the large electric power system and a suitable limitation is imposed on the load of the electrical station when there is a flow of electric power from a steam turbine generator toward the electrical station and the result of deduction of the load at the electrical station from the flow of electric power is negative.

BRIEF DESCRIPTION OF THE DRAWINGS

FIG. 1 is a schematic diagram showing one form of the arrangement of an electric power system.

FIG. 2 is a single-line diagram showing one form of the relation among the bus bars, power transmission lines and feeders in an electrical station.

FIGS. 3a and 3b are block diagrams of an embodiment of the separation system according to the present invention.

FIG. 4 is a diagrammatic view showing one form of the manner of separation utilizing a frequency variation in the electric power system.

FIGS. 7a and 7b are block diagrams of another embodiment of the present invention.

FIGS. 10a and 10b are block diagrams of an embodiment of the present invention which is applicable to the electrical station shown in FIG. 9.

FIG. 13 is a block diagram of another form of the system shown in FIG. 3.

DESCRIPTION OF THE PREFERRED EMBODIMENTS

Figure 5:
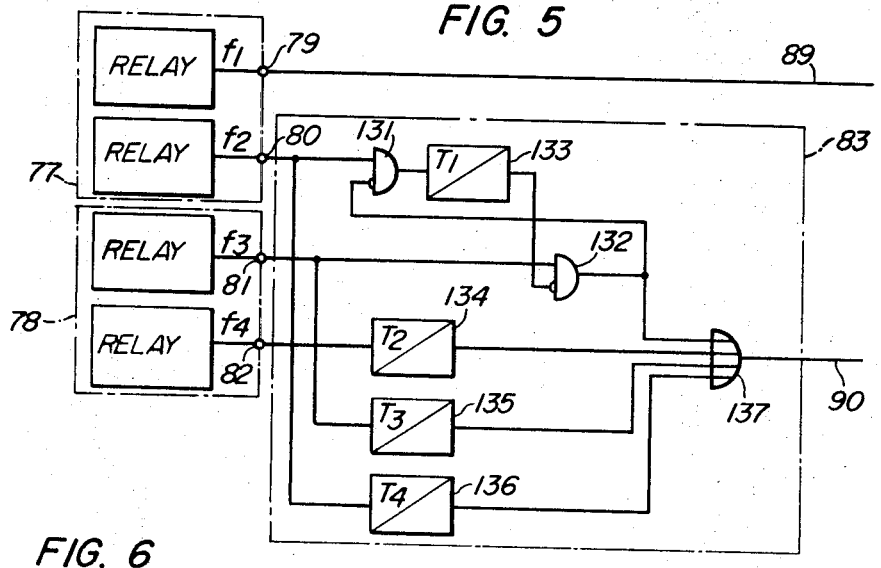
FIG. 5 is a block diagram of one form of the arrangement of a frequency variation detection circuit based on the principle shown in FIG. 4.

Referring to FIG. 1, a steam turbine generator $G_S$ is interconnected with a water turbine generator $G_H$ (large electric power system) for power supply to loads $L_A$, $L_B$ and $L_C$ of respective electrical stations A, B and C disposed therebetween. In a certain load condition, the loads $L_A$ and $L_C$ are supplied with electric power from the respective generators $G_S$ and $G_H$, while the load $L_B$ is supplied with electric power from both the generators $G_S$ and $G_H$. In this case, the electrical station B is called a confluence point of flows of electric power. In case serious fault occurs as described previously, the interconnection is cut off at the confluence point or electrical station B so as to operate the steam power system independently of the water power system thereby to prevent dropout of the steam turbine generator $G_S$.

The manner of separation between steam and water power systems at such a confluence point is disclosed, for example, in the Japanese magazine entitled "Ohm," March 1966, page 39. According to the disclosure, an electrical station which may become the confluence point is presupposed and a plurality of separable points are previously disposed in the electrical station, the electrical station being so watched and operated that the flow of electric power at the separation point is as little as possible.

The above manner of system separation will be described more in detail with reference to FIG. 2. FIG. 2 represents, for example, the arrangement of the electrical station B in FIG. 1. The electrical station B has bus bars 1 and 2, power transmission lines 3 and 4 which are connected with the steam turbine generator $G_S$ and the water turbine generator $G_H$, respectively, disconnecting switches 5, 6, . . . 16, circuit breakers 17, 18, . . . 21, and feeders 22, 23, . . . 26 for feeding the load $L_B$.

In the arrangement shown in FIG. 2, it is supposed that the circuit breakers 18 and 21 are in their closed position so that the bus bars 1 and 2 are energized by the steam turbine generator $G_S$ and the water turbine generator $G_H$, respectively, and the feeders 22 and 23 are connected with the bus bar 1, while the feeders 24, 25 and 26 are connected with the bus bar 2. When the electric power supplied from the steam turbine generator $G_S$ is more or less than the loads required by the feeders 22 and 23, the surplus or shortage in the power suitably passes between the systems through the circuit breaker 17.

In case serious fault as described previously should occur in the arrangement shown in FIG. 2, the circuit breaker 17 is opened to separate the steam power system from the water power system. Of course, the circuit breakers 18 and 21 may be opened to effect the separation. It is therefore necessary to watch the flows of electric power into the circuit breaker 17 and into the loads of the feeders and to properly select the distribution of the feeders relative to the bus bars so as to minimize always the flows of electric power through the circuit breaker 17.

Such a procedure may not only put a heavy burden on the operator but also result in the occurrence of fault due to erroneous manipulation. A further problem arises from the fact that an electrical station which is adapted to function as the confluence point for effecting the system separation thereat does not necessarily become a true confluence point depending on the operating conditions of the whole system. Another problem is that the separation can be effected only at a point which is preselected as a separation point and it is unable to select another point as such a separation point although separation is desired at the latter point.

These problems are obviated by the present invention. An embodiment of the present invention will be described with reference to FIG. 3. A steam power plant $G_S$ includes therein a plurality of steam turbine generators $G_{S1}$, $G_{S2}$ and $G_{S3}$. Electrical stations A and B have respective loads $L_A$ and $L_B$. Power transmission lines 31, 32 and 33 interconnect the steam turbine generators with a water turbine generator $G_H$ through the electrical stations A, B and C (not shown) and through circuit breakers 34, 35, . . . 41 and bus bars 42, 43 and 44. A transformer 45 has its primary winding connected with the bus bar 43 and its secondary winding connected through circuit breakers 46, 47, . . . 50 with feeders 51, 52, . . . 55 having respective loads. A transformer 56 has its primary winding connected with the bus bar 44 and its secondary winding connected through a plurality of circuit breakers with a plurality of feeders having respective loads. One of these circuit breakers is represented by the reference numeral 57, while one of these feeders is represented by the reference numeral 58. Reference numerals 59 and 60 denote voltage transformers. Reference numerals 61, 62, . . . 68 denote current transformers. Power-voltage converters 69, 70, . . . 76 which consist essentially of, for example, hall generators generate a voltage corresponding to the electric power transmitted through the feeders. Frequency relays 77 and 78 generate an output when the frequency of the system falls down to a predetermined value. The frequency relay 77 is set to generate its output at a frequency higher than that at which the frequency relay 78 is set to generate its output. Thus, the combination of the frequency relays 77 and 78 has a high and a low setting. These outputs appear at terminals 79 and 80 and at terminals 81 and 82, respectively, when the predetermined frequency settings of the respective frequency relays 77 and 78 are reached. A frequency variation detector 83, whose structure will be described later, generates an output in a shorter time which is dependent upon the larger variation rate in the frequency. Condition contacts 84, 85 and 86 are associated with the generators $G_{S1}$, $G_{S2}$ and $G_{S3}$, respectively, so that, when any one of these generators can not participate in the single operation of the steam power system, the condition contact corresponding to the specific generator is urged to its open position. An adder 87 delivers the sum of the outputs from those generators which can participate in the single operation of the steam power system, that is, those generators connected with specific ones of the condition contacts 84, 85 and 86 which are in their closed position. Pilot wires 88, 89 and 90 are disposed to connect between the steam power plant $G_S$ and the electrical station A. The generator output signal is transmitted by way of the pilot wire 88. Voltage collation circuits 91, 92, . . . 95 are operative to successively collate the generator output signal with the signals corresponding to the loads of the respective feeders 51, 52, . . . 55 with a polarity as shown in FIG. 3. More precisely, the collating operation is such that the load of the feeder 51 is first deducted from the generator output (the sum of the outputs from the generators which can participate in the single operation of the steam power system), and then the load of the feeder 52 is deducted from the remainder, and so on.

Leveler detectors 97, 98, . . . 101 receive the outputs from the respective collation circuits 91, 92, . . . 95. Each of the level detectors delivers its output when the output from the corresponding collation circuit is negative. In the electrical station B, there are similar voltage collation circuits which are associated with similar level detectors. One of these voltage collation circuits is represented by the reference numeral 123, while one of these level detectors is represented by the reference numeral 124. Each level detector is combined with a delay circuit whose structure is described later so as to give an output representing the state existing before a predetermined time. AND circuits 102, 103, . . . 106 are connected with the respective level detectors 97, 98, . . . 101 so that the output from each level detector is applied to the corresponding AND circuit as an input thereto. The other input to these AND circuits 102, 103, . . . 106 is applied from a pulse circuit 107. The pulse circuit 107 delivers its output for a short time only in response to application thereto of an output from the frequency relay 77 which appears from the output terminal 79 of the frequency relay 77 and is transmitted through the pilot wire 89. The pulse circuit 107 may, for example, be a one-shot multivibrator.

Memory circuits 108, 109, . . . 112 are connected with the respective AND circuits 102, 103, . . . 106 so as to store the outputs from these AND circuits. The memory in these memory circuits 108, 109, . . . 112 is erased when an output is delivered from a NOT circuit 114. The NOT circuit 114 delivers its output in response to application thereto of the output from the frequency relay 77 which appears from the output terminal 79 of the frequency relay 77 and is transmitted through the pilot wire 89 as in the case of the pulse circuit 107. AND circuits 115, 116, . . . 119 are connected with the respective memory circuits 108, 109, . . . 112 so that the output from each memory circuit is applied to the corresponding AND circuit as an input thereto. The other input to these AND circuits 115, 116, . . . 119 is applied from the frequency variation detector 83 by way of the pilot wire 90. The circuit breakers 46, 47, . . . 50 are tripped when the respective AND circuits 115, 116, . . . 119 deliver their output. The output from any one of the memory circuits 108, 109, . . . 112 is applied through an OR circuit 121 to an AND circuit 120 as an input to the latter. The other input to the AND circuit 120 is applied from the frequency variation detector 83 by way of the pilot wire 90. When the AND circuit 120 delivers its output, the circuit breaker 39 is tripped to separate the steam power system from the water power system.

Although the arrangement and structure of the steam power plant GS and the electrical station A have principally been described in the above, the electrical station B and another electrical station C (not shown) have an arrangement and structure similar to those described above. However, the arrangement and structure of the electrical stations B and C differ somewhat from those of the electrical station A in that tripping of circuit breakers in the succeeding electrical station must be prevented in spite of the appearance of an output from the level detectors in the case in which the separation at the preceding electrical station nearer to the steam power plant than the particular electrical station is about to take place.

The arrangement and structure of the electrical station B will briefly be described. The outputs from the frequency relay 77 and the frequency variation detector 83 are transmitted to the electrical station B by way of respective pilot wires 89' and 90', and thence to the electrical station C by way of respective pilot wires 89" and 90". The signal obtained by deducting the load of the electrical station A from the generator output is applied to the voltage collation circuits, one of which is represented by the reference numeral 123, where the signal is successively collated with the loads of feeders in the electrical station B. The result of collation is transmitted to the electrical station C by way of a pilot wire 88". When the output from the collation circuit 123 is negative, a level detector generally represented by the reference numeral 124 generates its output. An AND circuit represented by the reference numeral 125 delivers its output when both the level detector 124 and pulse circuit 107' generate their output. A memory circuit represented by the reference numeral 126 stores the output from the AND circuit 125. The memory in the memory circuit 126 is erased when a NOT circuit 114' generates its output. The outputs from the memory circuit 126 and the frequency variation detector 83 are applied to an AND circuit 127, while the outputs from an OR circuit 121' and the frequency variation detector 83 are applied to an AND circuit 128. The circuit breakers 57 and 41 are tripped when the respective AND circuits 127 and 128 generate their output, as is the case with the AND circuits 115, 116, . . . 120 in the electrical station A. However, the electrical station B differs from the electrical station A in that the output of the OR circuit 121 in the electrical station A is connected by way of a pilot wire 122 with a NOT circuit 129 which generates its output in the absence of any signal input thereto and provides for an AND condition for the AND circuits 127 and 128. When an output is delivered from the OR circuit 121 and is transmitted to the electrical station B by way of the pilot wire 122 or when an output is delivered from the OR circuit 121' in the electrical station B, the above fact is transmitted to the electrical station C by way of a pilot wire 122'.

Prior to describing the operation of the embodiment of the present invention shown in FIG. 3, the structure and operation of the frequency relays 77 and 78, the frequency variation detector 83, and the delay circuit affixed to the level detectors will be described.

Referring to FIGS. 4 and 5, the mode of variation of the frequency in the system and one form of means for detecting such frequency variation will first be described. Suppose that the system frequency is set at $f_0$ and this system frequency decreases to $f_1, f_2, \ldots$ from time to at various rates of variation as seen in FIG. 4. It is more dangerous for the proper operation of the steam turbine generator when the rate of variation is greater and the range of reduction in the frequency is larger. It is therefore necessary to separate the steam turbine generator from the power system as soon as possible. This can be attained by an arrangement as for example shown in FIG. 5. The frequency relays 77 and 78 detect the frequency of voltage in the bus bar 42 as seen in FIG. 3 and their outputs appear at the terminals 79, 80 and 81, 82 when the frequencies $f_1, f_2$ and $f_3, f_4$ are detected, respectively. The output from the terminal 80 is applied to an INHIBIT circuit 131 as a signal input to the latter. The inhibit signal input to the INHIBIT circuit 131 is applied from an INHIBIT circuit 132. The output from the terminal 81 is applied to the INHIBIT circuit 132 as a signal input to the latter. A timer 133 receives its input from the INHIBIT circuit 131 and generates its output after a predetermined time $T_1$. The output from the timer 133 is applied to the INHIBIT circuit 132 as an inhibit signal input to the latter. The outputs from the terminals 82, 81 and 80 are applied to timers 134, 135 and 136, respectively. These timers 134, 135 and 136 deliver their output after predetermined times $T_2$, $T_3$ and $T_4$, respectively. The outputs from the timers 134, 135 and 136 are continuously delivered as far as the inputs thereto are applied for a predetermined time and continuously applied from then on but cease to appear immediately when there are no more inputs thereto.

The outputs from the INHIBIT circuit 132 and the timers 134, 135 and 136 are applied to an OR circuit 137 as inputs to the latter. Therefore, when the frequency drops to $f_2$ and then drops to $f_3$ within the time $T_1$, an output appears from the INHIBIT circuit 132. When the frequency drops to $f_4$, an output appears from the timer 134 within the time $T_2$. When the frequency drops to $f_3$, an output appears from the timer 135 within the time $T_3$. Similarly, when the frequency drops to $f_2$, an output appears from the timer 136 within the time $T_4$. Thus, an output appears from the circuit 83 through the OR circuit 137.

Figure 6:
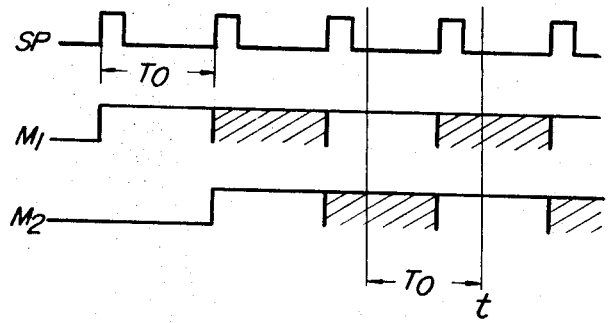
FIG. 6 is a diagrammatic illustration of the basic idea of a detection and memory circuit working as a delay element.

An output appears at the terminal 79 when the frequency drops to $f_1$. The level detectors are continuously watching the result of collation between the generator output transmitted by way of the pilot wire 88 and the outputs from the power-voltage converters associated with the respective feeders and deliver their output when the result of collation is negative. However, the output from the lever detector corresponds to the state existing before a predetermined time $T_0$. Thus, the state existing before a predetermined time can be known by delaying the output from the level detector by such means as a delay circuit utilizing the charging and discharging operation of a capacitor. Alternatively, a detection and memory device disclosed, for example, in Japanese patent publication No. 18,481/1968 may be employed to obtain a freely variable delay time. This device is advantageous in that synchronized outputs can be derived from detection circuits. Referring to FIG. 6, the operation of the detection and memory device will briefly be described. As seen in FIG. 6, this device employs a train of short sampling pulses SP having a period $T_0$ and two memory circuits $M_1$ and $M_2$. The memory circuits $M_1$ and $M_2$ are so designed that they are alternately supplied with an input as the sampling pulses SP appear so as to store such input therein and deliver their output during the time $T_0$ as shown by the hatching. Thus, the device delivers a continuous output which consists of the outputs from the memory circuits $M_1$ and $M_2$. Consider the output from the device at time $t$. It is apparent that the input stored in the memory circuit $M_1$ before $T_0$ is delivered as an output from the device. According to the detection and memory device having a function as described above, the output state at the same time of all the detection circuits can be stored provided that the sampling pulses are common to all, and the period $T_0$ or delay time for renewing the memory contents can freely be set to lie over a wide range.

Now, the operation of the embodiment of the present invention shown in FIG. 3 will be described in detail. In the steam power plane $G_S$, the quantities of electric power generated by the steam turbine generators $G_{S1}$, $G_{S2}$ and $G_{S3}$ are detected by the respective power-voltage converters 69, 70 and 71. The signals representing the power of those generators which can participate in the single operation are supplied to the adder 87 so that the corresponding signal is transmitted by way of the pilot wire 88. The generator output signal transmitted through the pilot wire 88 is collated with a polarity as shown with the signal of the converter 72 which detects the load of the feeder 51. The load of the feeder 52 is then deducted from the signal obtained by deducting the load of the feeder 51 from the generator output signal. A similar operation is repeated successively.

Whether the result of collation is positive or negative is detected by each lever detector. The signal derived by deducting the loads of the feeders from the generator output signal is transmitted to the electrical station B by way of the pilot wire 88' and then to the electrical station C by way of the pilot wire 88" so that the level detectors therein perform a similar operation. Therefore, the appearance of an output from a particular level detector indicates the fact that the load of the feeder associated with the particular level detector should not be energized solely by he electric power supplied from the steam turbine generator but should be energized by a combination of the electric power supplied from the steam turbine generator and the electric power supplied from the water turbine generator. At the same time, the presence of any one level detector delivering its output in a particular electrical station means the fact that the particular electrical station is the confluence point of the flows of electric power.

If the system frequency should fall down for some reason, an output appears first at the terminal 79 of the frequency relay 77. The output signal is transmitted to the electrical stations A, B and C by way of the pilot wires 89, 89' and 89", with the result that the pulse circuits 107 and 107' generate a pulse. When the level detectors are delivering their output at the time when the pulse is generated from the pulse circuits 107 and 107', outputs delivered from the corresponding AND circuits 102, 103, . . . 106 and 125 are stored in the corresponding memory circuits 108, 109, . . . 112 and 126. As the system frequency drops further, an output appears from the frequency variation detector 83 having a structure as shown in FIG. 4 and is transmitted to the electrical stations A, B and C by way of the pilot wires 90, 90' and 90". In the electrical station A which is nearest to the steam power plant, the appearance of the signal in the pilot wire 90 results in delivery of outputs from those of the AND circuits 115, 116, . . . 119 corresponding to those of the memory circuits which produce memory outputs therefrom, and consequently, the corresponding ones of the circuit breakers 46, 47, . . . 50 are tripped. At the same time, the appearance of an output from any one of the memory circuits results in delivery of an output from the OR circuit 121. As a result, the AND circuit 120 delivers its output to trip the circuit breaker 39 thereby to separate the steam power system from the water power system. The output appearing from the OR circuit 121 is transmitted to the electrical stations B and C by way of the pilot wires 122 and 122'.

The operation carried out in the electrical stations B and C is essentially the same as that performed in the electrical station A. That is, an output appears from the level detector when the result of collation is negative and any reduction in the system frequency is stored in the memory circuit. As the system frequency drops further, outputs are delivered from the AND circuits 127 and 128 for giving instructions to trip the circuit breakers 57 and 41 in the feeder and power transmission line, respectively. However, due to the fact that the electrical station A which is nearer to the steam power plant than the electrical stations B and C is possibly the confluence point, it is unreasonable to separate the system at the electrical station B or C and to limit the loads therein merely because of the fact that the level detector in the electrical station B or C delivers its output.

Therefore, in the electrical station B, for example, the signal output delivered from the OR circuit 121 and transmitted to the station by way of the pilot wire 122 is utilized to prevent the circuit breakers from tripping. More precisely, the circuit breakers in the electrical station B would not be tripped until the same conditions as in the electrical station A plus the condition that there is an output from the NOT circuit 129, that is, the electrical station A is not the confluence point of the flows of electric power, are satisfied. It will be understood that the tripping condition in the electrical station C is set up after confirming that both the electrical stations A and B are not the confluence point of the flows of electric power. An OR circuit 130 is disposed in the electrical station C for this purpose.

In FIG. 7 showing another embodiment of the present invention, like reference numerals are used to denote like parts appearing in FIG. 3 since the present embodiment is essentially similar to that shown in FIG. 3. In the present embodiment, an effort is made to minimize the number of pilot wires connecting the electrical stations where there is not sufficient room to accommodate so many pilot wires. In FIG. 7, those pilot wires except pilot wires 88, 88' and 88" are removed so that determination may be made individually in the electrical stations.

As will be apparent from comparison with FIG. 3, the embodiment shown in FIG. 7 comprises a set of frequency relays and a frequency variation detector in each of electrical stations A, B and C which may become the separating point. As in the case of FIG. 3, the outputs from these elements are utilized to control memory circuits and to actuate AND circuits for tripping circuit breakers. A level detector 131 is disposed in each of the electrical stations B and C which are remote from a steam power plant $G_S$ so that the appearance of an output from the level detector 131 results in the absence of any output from a NOT circuit 129 thereby to prevent tripping of the circuit breakers in the electrical stations B and C. Like other level detectors, the level detector 131 delivers its output when the input thereto is negative, and a delay circuit is likewise affixed thereto to provide for the relation in respect of time. Therefore, when the signal transmitted from the electrical station A by way of the pilot wires 88' and 88'' is negative, the circuit breakers in the electrical stations B and C are prevented from tripping. In other words, the fact that the signal transmitted through the pilot wires 88' and 88'' is negative means that the steam power system should be separated at the electrical station A. Since the steam power system has necessarily been separated at the electrical station A, the circuit breakers in the electrical stations B and C are prevented from tripping. This means that the electrical stations B and C detect a signal which is equivalent to the signal transmitted through the pilot wires 122 and 122' in FIG. 3.

The embodiment shown in FIG. 7 is advantageous for use in the case in which there is a severe limitation to the number of pilot wires, since a set of pilot wires is merely needed in this embodiment. On the other hand, the present embodiment has a disadvantage as described below, but such a disadvantage may not pose any problem in practical use. More precisely, the result of operation by a collation circuit 95 is simultaneously detected by level detectors 101 and 131. If the result of operation gives a small negative value, such a value may not be detected by the level detector 101 and may be detected by the level detector 131. In such a situation, the circuit breakers in the electrical stations B and C nearer to the water power plant are entirely prevented from tripping and at the same time, the steam power system cannot be separated at the electrical station A because any one of the level detectors therein does not develop its output. In order to avoid such a trouble, the level detector 131 may be set to operate with a detection sensitivity which is somewhat lower than that of the level detector 101 so that the level detector 101 can necessarily be actuated whenever the level detector 131 is actuated. The above manner of operation may possibly result in a situation where complete outage takes place in the electrical station B. However, the separation of the steam power system may be considered to be successfully effected since the primary purpose is the separation of the steam power system. Further, the fact that all the level detectors in an electrical station deliver their output means that the confluence point may possibly reside in another electrical station which is nearer to the steam power plant. Accordingly, the circuit breakers in the former electrical station may be prevented from tripping for a predetermined time until the presence or absence of the flow of electric power from the steam power plant is ascertained so that the separation may be effected at such electrical station only in the case in which there is a flow of electric power from the steam power plant.

Figure 8:
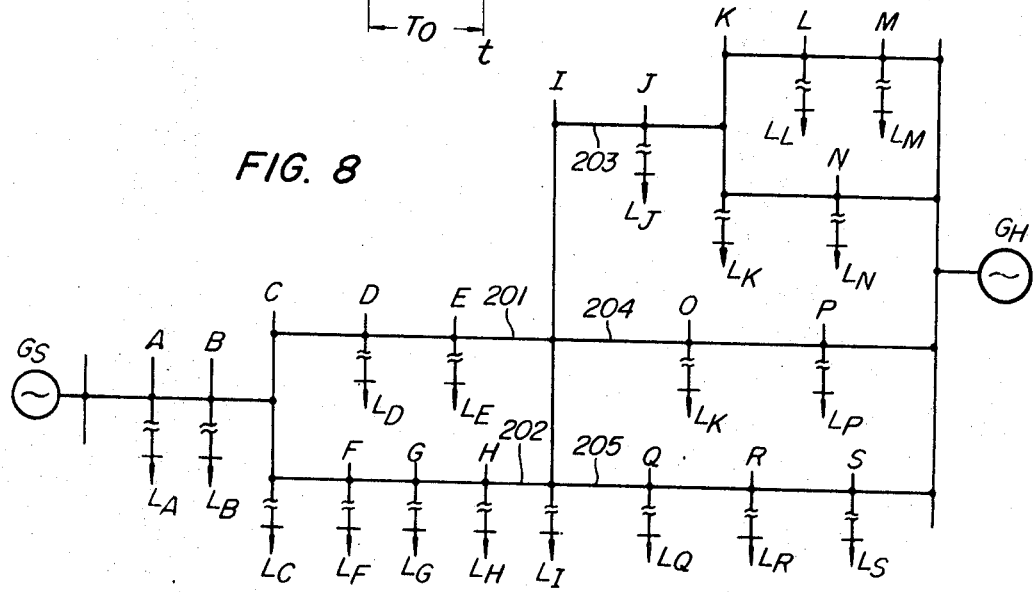
FIG. 8 is a diagrammatic view of one form of the arrangement of an electric power system having parallel branch routes.

Referring to FIG. 8, there is shown an electric power system having an arrangement different from that shown in FIG. 1. The electric power system shown in FIG. 8 comprises a steam turbine generator $G_S$, a water turbine generator $G_H$, and electrical stations A, B, . . . S disposed on the power transmission lines connecting between the steam turbine generator $G_S$ and the water turbine generator $G_H$. The electrical stations A, B, . . . S have respective loads $L_A$, $L_B$, . . . $L_S$. Where the electrical stations have parallel branch routes connecting between the steam turbine generator $G_S$ and the water turbine generator $G_H$ as seen in FIG. 8, the embodiments described above are not necessarily applicable in their proposed form. The embodiment shown in FIG. 3 is sufficiently applicable to the electrical stations A, B, D, E, . . . which are disposed on a single route as seen in FIG. 8. However, in the case of the electrical stations C, I and K which are connected with the steam turbine generator $G_S$ and the water turbine generator $G_H$ by way of two or more routes, the flow of electric power thereinto has various directions so that the above-described embodiment must be amended accordingly.

FIG. 9 shows some typical patterns of the flowing direction of electric power to an electrical station having a plurality of routes. The electrical station I in FIG. 8 is taken herein by way of example. Reference numerals 201, 202, 203, 204 and 205 designate a route to the electrical stations D and E, a route to the electrical stations F, G and H, a route to the electrical station J, a route to the electrical stations O and P, and a route to the electrical stations Q, R and S, respectively. The electric power flow in these routes has various directions as shown by the arrows depending on the load and generated power. Therefore, a device must be made to deal with whatever case so as to effect safe and positive separation as in the previous embodiments.

Figure 10A:
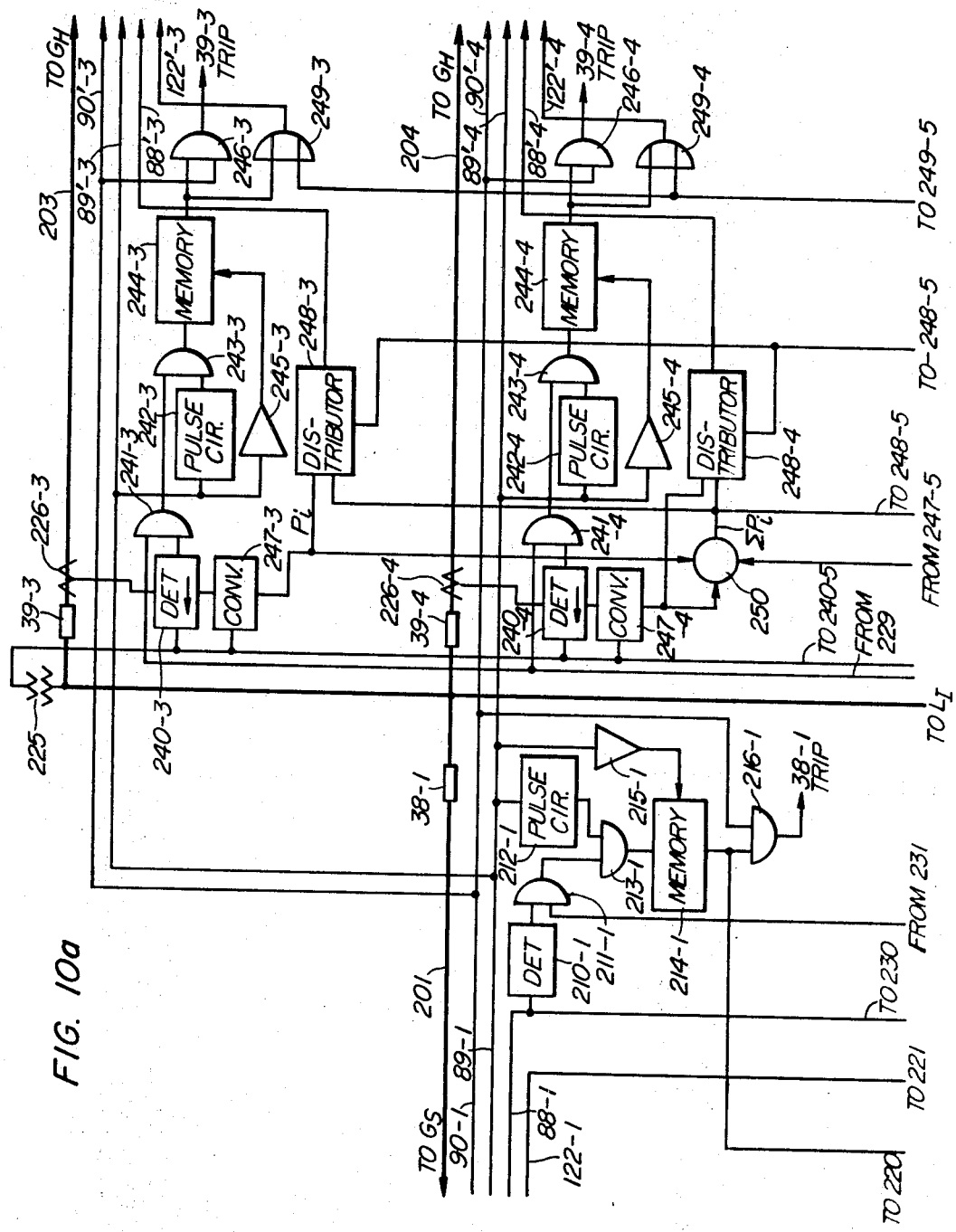

FIG. 10 illustrates a useful embodiment applicable to such an electrical station, for example, the electrical station I in FIG. 8. In FIG. 10, like reference numerals are used to denote like parts appearing in FIG. 3. Further, those elements which have the same function but are disposed on different routes are designated by the same reference numeral and suffixes —1, —2, . . . —5 are affixed thereto to clearly indicate that they are disposed on the routes 201, 202, . . . 205. From Comparison between FIG. 10 and FIG. 3, it will be apparent that the arrangement shown in FIG. 10 is essentially similar to that shown in FIG. 3 except that there are a plurality of routes and a measure to deal with the direction of electric power flow is necessary.

The function of those elements which are not shown in FIG. 3 will first be described. Reference numerals 210, 229 and 231 designate level detectors having a delay element. The level detectors 210, 229 and 231 are thus similar to level detectors 97, 98, . . . 101. The level detectors 210 and 229 deliver their output when the input signal applied thereto is positive. The level detector 231 delivers its output when the input signal applied thereto is negative. Reference numerals 230 and 250 designates adders. Reference numerals 211, 213, 216, 221, 241, 243 and 246 designate known AND circuits. Reference numerals 220, 222 and 249 designate known OR circuits. Reference numerals 215, 223, 224 and 245 designate known inverters. Reference numerals 214 and 244 designate known memory circuits which store the output from the AND circuits 213 and 243, respectively. The memory in the memory circuits 214 and 244 is erased in response to delivery of an output from the inverters 215 and 245, respectively. Reference numerals 212 and 242 designate pulse circuits which are the same as a pulse circuit 107. Reference numerals 225 and 226 designate a voltage transformer and a current transformer, respectively. Reference numeral 240 designates a power direction detector from which an output appears when the electric power flows in a direction shown by the arrow. The power direction detector 240 has a delay element therein as in the case of the level detectors 97, 98, . . . 101. Reference numeral 247 designates a power-voltage converter which delivers a voltage output proportional to the electric power when the electric power flows toward the water power plant (water turbine generator $G_H$), but does not deliver any output when the electric power flows toward the steam power plant (steam turbine generator $G_S$).

Figure 11:
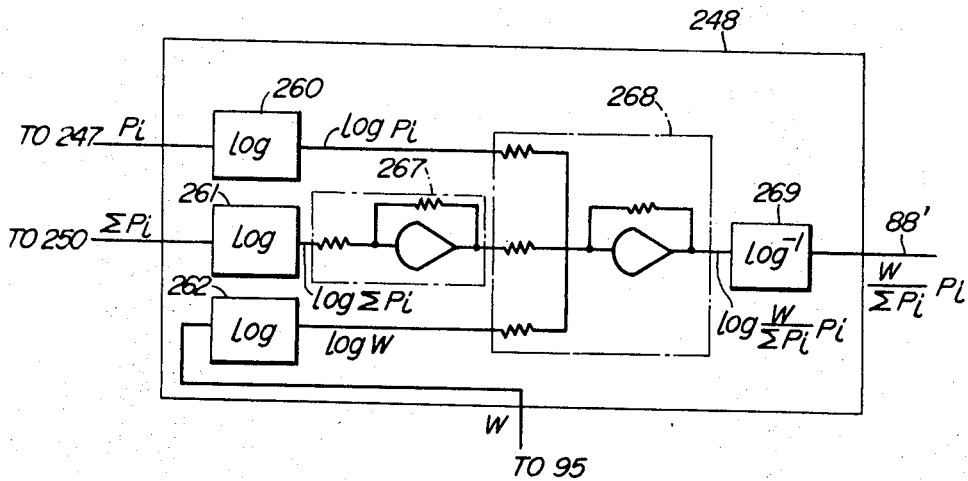
FIG. 11 is a diagrammatic view of a distribution circuit preferably employed in the embodiment shown in FIG. 10.

Reference numeral 248 designates a distribution circuit an example of which is shown in FIG. 11. The distribution circuit 248 is provided so that the remaining electric power W obtained by deducting the load of the electrical station from the electric power flowing from the steam power plant can be distributed depending on the quantity of electric power $Pi$ flowing toward the water power plant through each route. The operation of the distribution circuit 248 will be described with reference to FIG. 11 before giving detailed description as to the operation of the system shown in FIG. 10. The distribution circuit 248 comprises antilogarithm-logarithm converters 260, 261 and 262, a logarithm-antilogarithm converter 269, a polarity inverter 267 and an adder 268. These circuits can be constituted by well-known electronic circuits and circuits employing an operational amplifier. When $Pi$, $\Sigma Pi$ and $W$ are led into the respective circuits 260, 261 and 262, an operation as shown in FIG. 11 is carried out so that the desired signal $Pi/\Sigma Pi \cdot W$ can be derived from the pilot wire 88′.

The patterns of the electric power flow shown in FIG. 9 will next be discussed. In the case of the pattern shown in FIG. 9a, the flow of electric power in each route is directed toward the water power plant. In this case, individual confluence points of electric power flow should reside, for example, in the electrical stations J, O and R on the respective routes 203, 204 and 205 which stations are nearer to the water power plant than the electrical station I. Thus, the separation of the steam power system from the water power system is not made at the electrical station I. That is, not only the level detectors 97, 98, . . . 101 do not deliver their output but also the circuit breakers 38 and 39 are prevented from tripping due to the fact that the OR circuit 249 and the AND circuit 241 do not deliver their output since the flow of electric power is directed toward the water power plant.

Figure 9A:
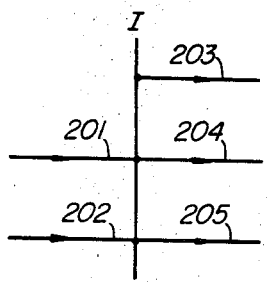
FIGS. 9a to 9e are a diagrammatic view showing the mode of electric power flow at an electrical station having parallel branch routes.
Figure 9B:
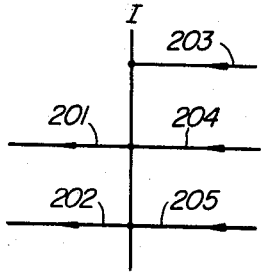

In the case of the pattern shown in FIG. 9b, the flow of electric power in each route is directed toward the steam power plant. In this case, individual confluence points of electric power flow should reside, for example, in the electrical stations E and G on the respective routes 201 and 202 which stations are nearer to the steam power plant than the electrical station I. Thus, the separation of the steam power system from the water power system is not made at the electrical station I. That is, the circuit breakers 38 and 39 are prevented from tripping due to the fact that both the pilot wires 88–1 and 88–2 transmit a negative output and the level detector 229 does not deliver any output.

Figure 9C:
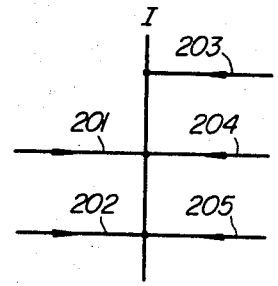

In the case of the pattern shown in FIG. 9c, the flow of electric power in the routes 201 and 202 is directed toward the water power plant, while the flow of electric power in the routes 203, 204 and 205 is directed toward the steam power plant. Thus, the electrical station I is the confluence point of the flows of electric power. In this case, at least one of the level detectors 97, 98, . . . 101 delivers an output and both the OR circuit 220 and the AND circuit 221 do not deliver any output. Therefore, the circuit breaker 39 is tripped to release the interconnection between the steam power plant and the water power plant and a suitable limitation is imposed on the load of the electrical station I.

Figure 9D:
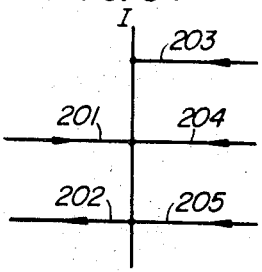

In the case of the pattern shown in FIG. 9d, the flow of electric power in the route 201 is solely directed toward the water power plant, while the flow of electric power in the routes 202 to 205 is directed toward the steam power plant. This pattern includes two cases, that is, a first case in which the electric power in the route 201 is so great that the output from the adder 230 becomes positive and a second case in which the electric power in the route 202 is so great that the output from the adder 230 becomes negative. In the first case, any special explanation will be unnecessary because the operation is the same as that described with regard to the case shown in FIG. 9c. This is because the resultant flow of electric power in the routes 201 and 202 is apparently directed to the water power plant although the flow of electric power in the route 202 is directed toward the steam power plant. In the second case, the load of the electrical station I is apparently solely supplied with power from the water turbine generator $G_H$ and the flow of electric power in the route 201 is diverted to the route 202. Of course, a portion of the flow of electric power from the water power plant flows into the route 202. In this case, therefore, tripping of the circuit breaker 39 for the separation of the steam power system from the water power system is prevented and no load limitation is performed in the electrical station I. On the route 201, the circuit breaker 38–1 is tripped to separate the steam power system from the water power system, while on the route 202, the steam power system is separated from the water power system at, for example, the electrical station H which is nearer to the steam power plant than the electrical station I. More precisely, due to the fact that the output from the adder 230 is negative and the signal transmitted through the pilot wire 88–1 is positive, the AND circuit 211 delivers its output to trip the circuit breaker 38–1 on the route 201 thereby to separate the steam power system from the water power system. At the same time, the OR circuit 220 delivers its output to prevent imposition of any limitation to the load of the electrical station I.

Figure 9E:
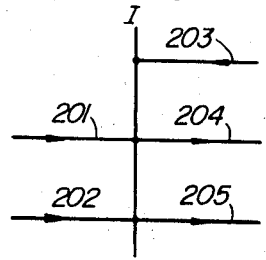

In the case of the pattern shown in FIG. 9e, electric power from the steam power plant flows by way of the routes 201 and 202 into the electrical station I to supply the load thereof and is further directed toward the water power plant by way of the routes 204 and 205, while the flow of electric power from the water power plant is directed toward the electrical station I by way of the route 203. In this case, the circuit breaker 39–3 on the route 203 is tripped to separate the steam power system from the water power system, while on the routes 204 and 205, the steam power system is separated from the water power system at, for example, the electrical stations O and Q which are nearer to the water power plant than the electrical station I. Of course, no limitation is imposed on the load of the electrical station I. More precisely, in this particular case, the circuit breaker 39–3 can be tripped due to the fact that the level detector 229 delivers its output and the power direction detector 240–3 delivers its output so that an output appears from the AND circuit 241–3.

Although there are various other cases including the combination of different routes, the above-described five cases cover substantially all the cases that can be considered. It will thus be understood that the embodiment shown in FIG. 10 which comprises a standardized device in each route can be used for the successful separation of a steam power system from a water power system in an electric power system having parallel branches.

Figure 12A:
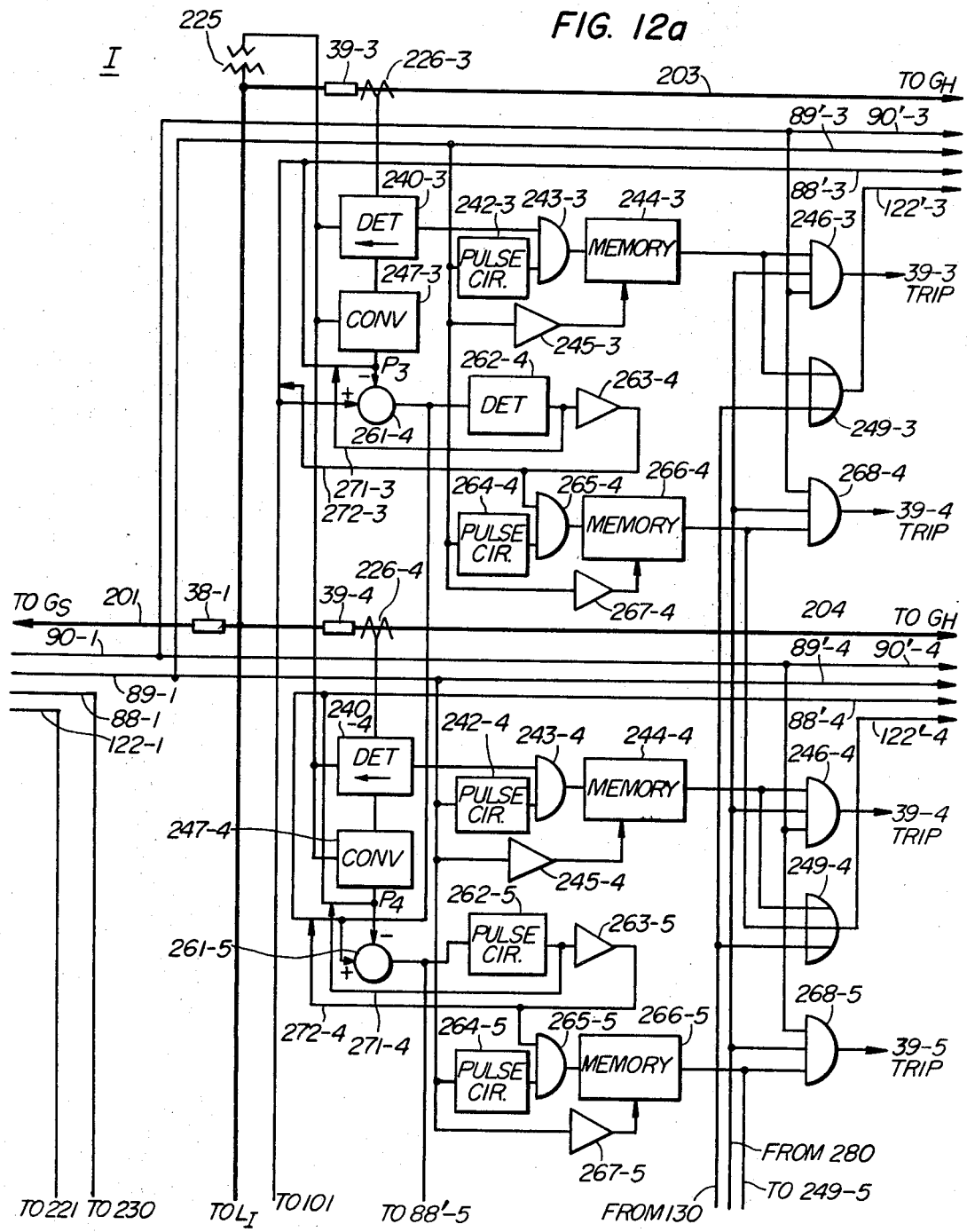
FIGS. 12a and 12b are block diagrams of another form of the system shown in FIG. 10.
Figure 12B:
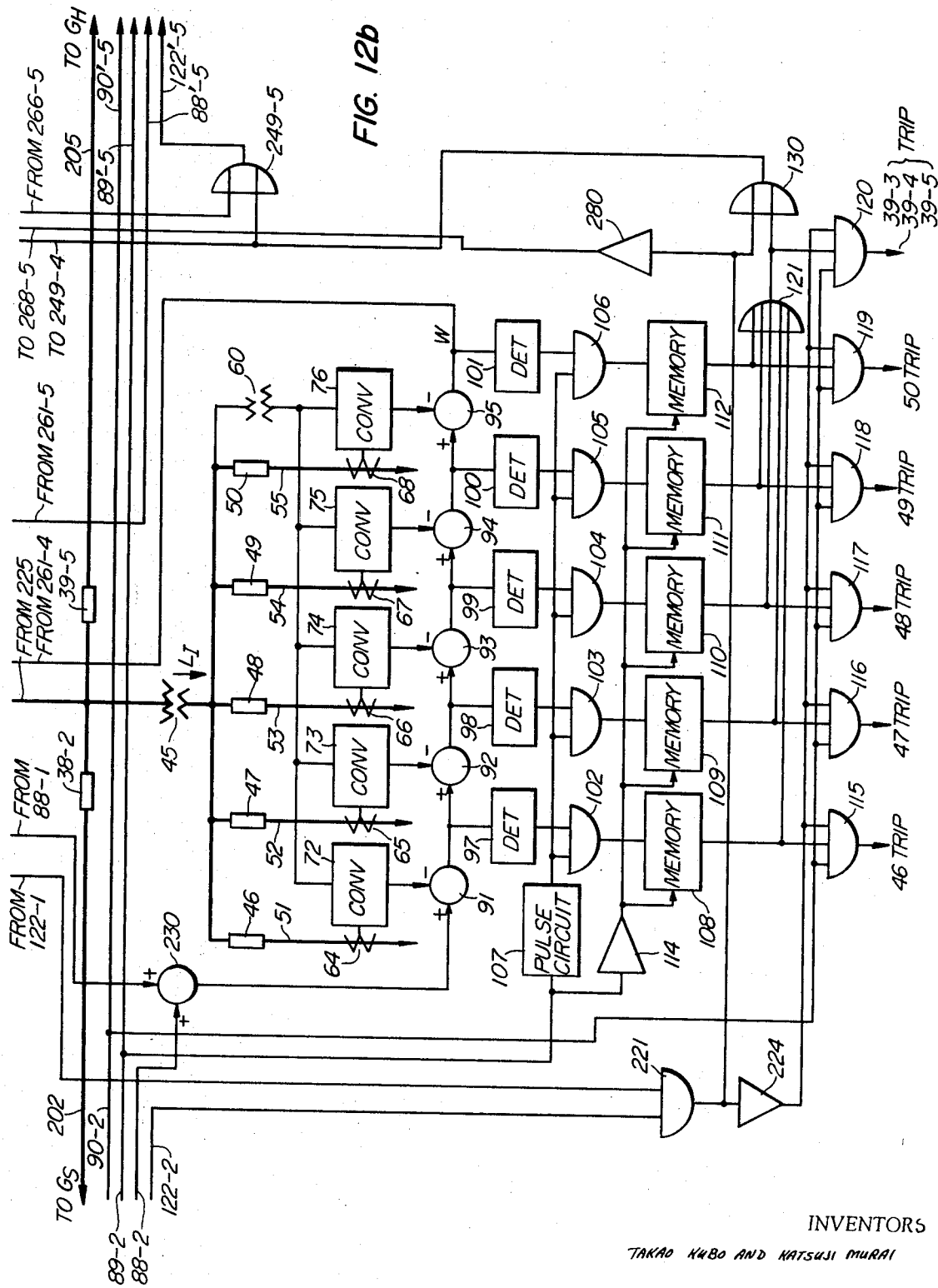

FIG. 12 shows a further embodiment of the present invention which is applicable to an electrical station similar to that shown in FIG. 10. In FIG. 12, like reference numerals are used to denote like parts appearing in FIG. 10.

The embodiment shown in FIG. 12 is essentially the same as that shown in FIG. 10 except that there is a difference in the method of distribution of the signal W to individual routes, which signal is obtained by deducting the load signal at the electrical station from the power signal supplied from the steam power plant. More precisely, instead of the provision of the distribution circuit 248, the electric power flow component in each route is successively deducted from the signal W and the remainder is distributed to individual routes.

Referring to FIG. 12, the electrical station I comprises voltage collation circuits 261 including a collation circuit 261–4 which operates $W-P_3$ and a collation circuit 261–5 which operates $(W-P_3)-P_4$, where $P_3$ is the output from a power-voltage converter 247–3 and $P_4$ is the output from a power-voltage converter 247–4. Level detectors 262 deliver an output when the output from the collation circuits 261 is positive. Needless to say, a delay element is affixed to each of the level detectors 262 as is also the case with level detectors 97, 98, . . . 101. The electrical station I further comprises inverters 263 and 267, pulse circuits 264, AND circuits 265 and 268, memory circuits 266, and an inverter 280. The operation of the memory circuits 266 is similar to that of memory circuits 244. A starting signal is applied through lines 271 and 272. Power signals can pass through the points shown by the arrows only when the starting signal is applied.

All the patterns shown in FIG. 9 apply also to the embodiment shown in FIG. 12. However, the control in the present embodiment is more simplified than the control in the embodiment of FIG. 10. In the present embodiment, the steam power system is separated from the water power system in a route where there is a flow of electric power from the water power plant. Further, in a route such as a route 205 which is the route of the last order connected with the water power plant, the output from the collation circuit 261–5 controls the interconnection between the steam power plant and the water power plant. More precisely, when electric power flows from the water power plant by way of the routes 203 and 204 and thus an output appears from power direction detectors 240, circuit breakers 39–3 and 39–4 are tripped due to the fact that an output appears from the AND circuits 246.

When there is still a flow of electric power W toward the water power plant (water turbine generator $G_H$) even though the load $L_I$ is deducted from the flow of electric power supplied from the steam power plant, the electric power $P_3$ flowing toward the water power plant through the route 203 is deducted from the electric power W which is the output from the collation circuit 95. When the output delivered consequently from the collation circuit 261–4 is positive, an output appears from the level detector 262–4 to apply the starting signal through the line 271–3 so that the electric power $P_3$ flowing through the route 203, that is, the output from the power-voltage converter 247–3 is supplied intact to a pilot wire 88′–3. When the output from the collation circuit 261–4 is negative, an output appears from the inverter 263–4 to apply the starting signal through the line 272–3 so that the electric power W flowing from the steam power plant toward the water power plant is supplied to the pilot wire 88′–3 independently of the electric power $P_3$ flowing toward the water power plant by way of the route 203. The output from the collation circuit 261–4 is supplied to the collation circuit 261–5 where similar processing is effected in relation to the electric power $P_4$ flowing toward the water power plant by way of the route 204. More precisely, $P_4$ is supplied to a pilot wire 88′–4 when $(W-P_3)-P_4>0$, and $W-P_3$ is supplied to the pilot wire 88′–4 when $(W-P_3)-P_4<0$. The output from the collation circuit 261–5 is transmitted intact through a pilot wire 88′–5 to an electrical station which is disposed on the route 205 at a position nearer to the water power plant than the electrical station I. When the output from the collation circuits 261–4 and 261–5 is negative, there is no electric power which flows toward the water power plant by way of the routes 204 and 205. In this case, an output appears from the AND circuits 268–4 and 268–5 to trip the circuit breakers 39–4 and 39–5.

It will be apparent from the above description that the route in which there is a flow of electric power from the water power plant and the route in which there is no flow of electric power from the steam power plant toward the water power plant are selected to separate the steam power system from the water system in the electrical station shown in FIG. 12 provided that the separation between the steam power system and the water power system is not effected at electrical stations which are disposed on the routes 201 and 202 at positions nearer to the steam power plant than the electrical station I, that is, when there is an output from the inverter 280. As in the case of the embodiment shown in FIG. 10, the present embodiment may employ a separation system which takes into consideration the backward flow of electric power toward the steam power system, but no description on such a system will be given herein.

In each of the embodiments described with reference to FIGS. 3, 10 and 12, arrangement has been such that the circuit breakers disposed nearer to the water power plant are tripped in an electrical station when this station is the confluence point of the flows of electric power. Where, however, the electric power flowing into such an electrical station from the steam power plant is less than a predetermined value, the above fact may be utilized to cause tripping of circuit breakers disposed nearer to the steam power plant thereby to eliminate whatever load limitation at the confluence point. This arrangement is effective to minimize the possibility of outage at the confluence point where the flow of electric power from the steam power plant may be very little. Although the steam turbine generator may be made to operate with a somewhat lighter load, this would not lead to an unsuccessful separation.

Another embodiment shown in FIG. 13 is intended to eliminate all the pilot wires connecting between electrical stations. In this embodiment, the point of separation between the steam power system and the water power system is determined depending upon the direction of the flow of electric power.

Referring to FIG. 13 wherein like reference numerals are used to denote like parts appearing in FIG. 3, the electrical station A comprises a voltage transformer 301, current transformers 302 and 303, and power direction detectors 305 and 306. An output appears from the power direction detectors 305 and 306 when the electric power flows in the directions shown by the arrows. A delay element is affixed to each of the power direction detectors 305 and 306. A power-voltage converter 307 delivers a positive voltage output which is proportional to the magnitude of the electric power when such electric power flows from the steam power plant toward the water power plant by way of a power transmission line 32. The output from the detector 307 is supplied to voltage collation circuits 91, 92, . . . 95 to be successively collated with the loads of individual feeders in the electrical station A. The electrical station A further comprises AND circuits 308, 309, . . . 313, an AND circuit 320, inverters 331, 332 and 333, and INHIBIT circuits 341, 342, . . . 345. Memory circuits 321 and 322 store the output from the respective AND circuits 310 and 311, while the memory stored therein is erased when an output appears from an inverter 114.

As will be apparent from FIG. 13, an output appears from the AND circuit 308 to trip a circuit breaker 39 thereby to separate the steam power system from the water power system when the power direction detectors 304 and 305 deliver their output, that is, when the electrical station is the confluence point of flows of electric power as shown at B in FIG. 1. At the same time, the INHIBIT circuits 341, 342, . . . 345 deliver their output to impose a suitable load limitation. On the other hand, when both the power direction detectors 305 and 306 do not deliver their output, that is, when the load $L_A$ of the electrical station A is supplied from the steam turbine generator $G_S$ and there is no flow of electric power from the water turbine generator $G_H$, an output appears from the AND circuit 309 to trip the circuit breaker 39. In this case, the steam power system is merely separated from the water power system and no load limitation is made in the electrical station A. In the embodiment of FIG. 13, a circuit breaker 38 may be tripped to separate the steam power system from the water power system in case the flow of electric power from the steam power plant is very little. In such a case, there is no need for imposing a load limitation.

It will be apparent from the above description that the present invention is featured by the fact that a steam power system can be properly separated from a water power system in the sound state of the electric power system before any drop in the system frequency occurs.

In accordance with another feature of the present invention, the operating conditions of the steam turbine generator are fully taken into consideration for the safe and reliable separation of the steam power system from the water power system.

It will be understood that many changes and modifications may be made in the practice of the present invention. For example, the power transmission line and the bus bars in the electrical station may have any suitable arrangement. What is needed is to detect a range in which a steam turbine generator can singly supply electric power in an electric power system comprising the interconnection of a steam turbie generator with a water turbine generator. The detection of variation in the frequency may be made by means which can detect a drop of the frequency to a predetermined value and delivers an output responsive to the degree of variation in the frequency. Moreover, the separation may be effected by detecting the fact that the frequency drops to a predetermined value.

Although the water turbine generator $G_H$ is referred to in the above description as a counterpart of the steam turbine generator $G_S$, it is to be understood that the above includes a large electric power system to which the steam turbine generator is connected. It is probable that such a large electric power system includes a large-scale steam turbine generator therein.

We claim:

1. In an electric power system in which a first power plant having at least one steam turbine generator is interconnected with a second power plant having a characteristic which differs from that of said first power plant, a system for separating said first power plant from said second power plant comprising pilot wire means for transmitting a signal representing the output from said steam turbine generator, means for deducting successively the load of feeders of electrical stations disposed between said power plants from said signal transmitted through said pilot wire means, means for detecting a load which can be singly supplied with electric power from said steam turbine generator and a load which can not be supplied with electric power from said steam turbine generator, and means responsive to a drop in the system frequency to a predetermined value to separate the electric power system including said first power plant from the electric power system including said second power plant at a specific electrical station which includes the feeder that can not be singly supplied with electric power from said steam turbine generator and is nearest to said first power plant.

2. A system as claimed in claim 1, in which said second power plant is a hydraulic power plant.

3. A system as claimed in claim 1, in which said second power plant is a large electric power system including therein a large-scale steam power plant.

4. A system as claimed in claim 1, in which a circuit breaker disposed in said electrical station at a position nearer to said second power plant is tripped to effect said separation, and limitation is imparted to the load in said electrical station.

5. A system as claimed in claim 1, in which a circuit breaker disposed in said electrical station at a position nearer to said first power plant is tripped to separate said first power plant from said second power plant when there is a flow of electric power from said first power plant toward said electrical station and the flow of electric power is less than a predetermined value.

6. A system as claimed in claim 1, in which when an electrical station has parallel branch routes and there is a flow of electric power directed from said electrical station toward said second power plant even though the load of said electrical station is deducted from the electric power directed thereto from said first power plant, said flow of electric power is distributed to the pilot wire means for the individual routes depending on the quantity of electric power flowing through said routes toward said second power plant.

7. A system as claimed in claim 1, in which, when an electrical station has parallel branch routes and there is a flow of electric power directed from said electrical station toward said second power plant even though the load of said electrical station is deducted from the electric power directed thereto from said first power plant, the quantities of electric power flowing toward said second power plant through the individual routes are successively deducted from the electric power, and the quantity of electric power flowing through a specific route toward said second power plant is used as a signal to be transmitted through the pilot wire means for said specific route when the result of deduction is positive, while the signal appeared before the deducting operation is used as a signal to be transmitted through the pilot wire means for said specific route when the result of deduction is negative.

8. A system as claimed in claim 6, in which a circuit breaker located in said electrical station at a position nearer to said second power plant and disposed on a route in which there is a flow of electric power from said second power plant is tripped to separate said first power plant from said second power plant.

9. A system as claimed in claim 7, in which a circuit breaker disposed in said electrical station at a position nearer to said second power plant and on a route in which there is a flow of electric power from said second power plant is tripped to separate said first power plant from said second power plant.

10. A system as claimed in claim 6, in which, when the flow of electric power toward said second power plant occurs in at least one of routes to said electrical station and the resultant flow of electric power is directed toward said first power plant, a circuit breaker located at a position nearer to said first power plant and disposed on said route in which the flow of electric power toward said second power plant occurs is tripped to separate said first power plant from said second power plant.

11. A system as claimed in claim 7, in which, when the flow of electric power toward said second power plant occurs in at least one of the routes to said electrical station and the resultant flow of electric power is directed toward said first power plant, a circuit breaker located at a position nearer to said first power plant and disposed on said route in which the flow of electric power toward said second power plant occurs is tripped to separate said first power plant from said second power plant.

12. A system as claimed in claim 6, in which the electric power signal is converted into logarithm for arithmetic operation and then converted into antilogarithm for the distribution thereof.

13. In an electrical station disposed in an electric power system in which a first power plant having at least one steam turbine generator is interconnected with a second power plant having a characteristic which differs from that of said first power plant, a system for separating said first power plant from said second power plant comprising means for detecting the fact that said electrical station is either supplied with electric power from both said first power plant and said second power plant or supplied with electric power singly from said first power plant and any substantial flow of electric power toward said second power plant does not occur, and means responsive to a drop of the system frequency to a predetermined value to separate said electric power system at a position nearer to second power plant, thereby imparting a limitation to the load of said electrical station so as to cancel the load previously supplied from said second power plant.

14. A system as claimed in claim 1, in which the point of separation is determined by a level detector having a delay element associated therewith.

15. A system as claimed in claim 13, in which the point of separation is determined by a level detector having a delay element associated therewith.

References Cited

UNITED STATES PATENTS 3,235,743   2/1966   Ryerson et al. _____ 307—87X

ROBERT K. SCHAEFER, Primary Examiner
H. J. HOHAUSER, Assistant Examiner